US010053267B2

(12) United States Patent
Le Blan et al.

(10) Patent No.: US 10,053,267 B2
(45) Date of Patent: Aug. 21, 2018

(54) METHOD FOR ASSEMBLING AN END-PIECE OF A FLEXIBLE PIPE AND ASSOCIATED PRE-ASSEMBLY (71) Applicant: TECHNIP FRANCE, Courbevoie (FR)

(72) Inventors: Benjamin Le Blan, Rouen (FR); German Bruno, Lyons (FR); Grégory Peckeu, Bourg-Achard (FR); Antoine Colmard, Etoutteville (FR)

(73) Assignee: TECHNIP FRANCE (FR)

( * ) Notice: Subject to any disclaimer, the term of this patent is extended or adjusted under 35 U.S.C. 154(b) by 244 days.

(21) Appl. No.: 14/772,906

(22) PCT Filed: Mar. 6, 2014

(86) PCT No.: PCT/EP2014/054301
§ 371 (c)(1),
(2) Date: Sep. 4, 2015

(87) PCT Pub. No.: WO2014/135612
PCT Pub. Date: Sep. 12, 2014

(65) Prior Publication Data
US 2016/0016708 A1 Jan. 21, 2016

(30) Foreign Application Priority Data

Mar. 7, 2013 (FR) ..................................... 13 52041

(51) Int. Cl.
B65D 59/06 (2006.01)
F16L 33/01 (2006.01)
(52) U.S. Cl.
CPC .............. B65D 59/06 (2013.01); F16L 33/01 (2013.01)
(58) Field of Classification Search
CPC .................................. B65D 59/06; F16L 33/01

USPC .................. 138/135, 109, 155, 177, DIG. 11
See application file for complete search history.

(56) References Cited

U.S. PATENT DOCUMENTS

2004/0066035 A1* 4/2004 Buon .................... F16L 33/003
285/222.2

FOREIGN PATENT DOCUMENTS

| EP | 1 407 182 B1 | 6/2005 | |
| FR | 2827032 A1 * | 1/2003 | .............. F16L 33/01 |
| JP | S 60 215190 | 10/1985 | |
| JP | S 62 101991 | 5/1987 | |

(Continued)

OTHER PUBLICATIONS

International Search Report dated Jun. 10, 2014 issued in corresponding International patent application No. PCT/EP2014/054301.

Primary Examiner — Craig Schneider
Assistant Examiner — David Deal
(74) Attorney, Agent, or Firm — Ostrolenk Faber LLP (57) ABSTRACT A method including the following steps: placing a rear locking collar (62) around an outer ply (25), placing a first shaping guide (82) for shaping the folding of the end segments (32) of the outer ply (25); folding the end segments (32) of the outer ply (25) rearwards, folding the end segments (32) of an inner ply (24) rearwards. Before the step for folding the end segments (32) of the inner ply (24) rearwards, a second shaping guide (84) is placed for shaping the folding of the end segments (32) of the inner ply (24), a second shaping guide (84) being separate from the first shaping guide (82), the end segments (32) of the inner ply (24) bearing on the second shaping guide (84) after the folding step.

8 Claims, 3 Drawing Sheets (56) References Cited

FOREIGN PATENT DOCUMENTS

| JP | S 62 113992 | 5/1987 |
|---|---|---|
| JP | H 03-38489 | 2/1991 |
| JP | H 04 171390 | 6/1992 |
| JP | H 05-231576 | 9/1993 |
| WO | WO 03/004921 | 1/2003 |

\* cited by examiner

METHOD FOR ASSEMBLING AN END-PIECE OF A FLEXIBLE PIPE AND ASSOCIATED PRE-ASSEMBLY

CROSS REFERENCE TO RELATED APPLICATIONS

The present application is a 35 U.S.C. § 371 National Phase conversion of PCT/EP2014/054301, filed Mar. 6, 2014, which claims benefit of French Application No. 13 52041, filed Mar. 7, 2013, the disclosure of which is incorporated herein by reference. The PCT International Application was published in the French language.

TECHNICAL FIELD OF THE INVENTION

The present invention relates to a method for assembling an end-piece of a flexible pipe, the flexible pipe including an inner tubular structure having a central axis, an inner ply of tensile armors positioned around the inner tubular structure and an outer ply of tensile armors positioned around the inner ply, the method comprising the following steps:
  placing a rear locking collar of the armor plies around the outer ply;
  placing a first shaping guide for shaping the folding of the end segments of the outer ply;
  folding the end segments of the outer ply rearwards while forming a bend in front of the locking collar, the end segments of the outer ply pressing on the first guide;
  folding the end segments of the inner ply rearwards.

BACKGROUND OF THE INVENTION

The pipe is in particular a flexible pipe of the unbonded type designed to transfer hydrocarbons through an expanse of water, such as an ocean, sea, lake or river.

Such a flexible pipe is for example made according to normative documents API 17J (Specification for Unbonded Flexible Pipe) and API RP 17B (Recommended Practice for Flexible Pipe) established by the American Petroleum Institute.

The pipe is generally formed by a set of concentric and superimposed layers. It is considered "unbonded" within the meaning of the present invention when at least one of the layers of the pipe is able to move longitudinally relative to the adjacent layers when the pipe is bent. In particular, an unbonded pipe is a pipe with no bonding materials connecting the layers forming the pipe.

The pipe is generally positioned through an expanse of water, between a bottom assembly, designed to collect the fluid recovered in the bottom of the expanse of water, and a floating surface assembly designed to connect and distribute the fluid. The surface assembly may be a semisubmersible platform, an FPSO or another floating assembly.

In a known manner, such a pipe includes a tubular inner structure comprising at least one pressure sheath. The pipe includes plies of tensile armor positioned around the inner tubular structure.

In some cases, for the exploitation of fluids in deep water, the flexible pipe has a length exceeding 800 m. The ends of the pipe have end-pieces for connecting to the bottom assembly and the surface assembly.

These pipes undergo very high axial tensile forces, in particular when the expanse of water in which the pipe is positioned is very deep.

In that case, the upper end-piece connecting the pipe to the surface assembly must react a very significant axial tension, which may reach several hundreds of tons. These forces are transmitted to the end-piece by means of plies of tensile armor extending along the pipe.

The assembly of the end-pieces of the pipe, in particular, the end of the plies of tensile armor in the end-piece, is a critical step to preserve the integrity of the pipe during its use.

To that end, during the assembly of the end-piece, the end segments of the armor plies are unstuck from the inner structure of the pipe and are folded rearwards to allow the insertion of a crimping assembly of the inner sheath of the pipe.

The end vault of the end-piece is next inserted at the end of the inner structure, and the end segments of the armor plies are folded toward the axis of the pipe against the vault.

Then, an outer cover of the end-piece is fastened on the vault, around the end segments of the armor plies and a material capable of solidifying is inserted into the intermediate chamber situated between the cover and the vault, so as to embed the end segments.

The separation of the end segments of the armor plies away from the inner structure must be done carefully to avoid damaging or mechanically biasing the end segments of the armor threads, so as to preserve their longevity over time.

To that end, WO 03/004921 describes an assembly method in which a three-part metal locking collar is engaged around armor plies behind the desired separation point.

Next, an annular guide made from a material making it possible to preserve the surface of the armor threads, for example nylon, is positioned on the locking collar.

The end segments of the outer ply are next folded rearwards around the annular guide, the end segments of the inner ply remaining pressed against the inner structure.

The nylon annular guide has a curved front surface that limits the curvature of the armors when they are folded rearwards.

Next, the anti-wear strip positioned between the inner ply and the outer ply is cut as close as possible to the separation point of the end segments of the outer ply, near the locking collar. The end segments of the inner ply are next turned over directly on the end segments of the outer ply substantially following the same curve radius.

The front crimping assembly and the vault are next placed, and the end segments are folded forward against the vault.

Such a method may be further improved. Indeed, the anti-wear strip positioned between the inner ply and the outer ply is cut as close as possible to the separation point of the outer ply. As a result, when the end segments of the two plies are folded toward the vault of the end-piece, the end segments of the outer ply may rub against those of the inner ply at the separation point, in the zone where the armor threads are hardened and where the mechanical strength is lower.

In some cases, this may lead to weakening of the mechanical properties of the pipe.

SUMMARY OF THE INVENTION

One aim of the invention is therefore to improve the method for assembling the end-piece of the pipe, in order to increase the mechanical strength of the pipe over time.

To that end, the invention relates to a method of the aforementioned type, characterized in that it includes, before the step for folding the end segments of the inner ply rearwards, the placement of a second shaping guide for shaping the folding of the end segments of the inner ply, the second shaping guide being separate from the first shaping guide, the end segments of the inner ply bearing on the second shaping guide after the folding step.

The method according to the invention may comprise one or more of the following features, considered alone or according to any technically possible combinations:

- after the folding step, the end segments of the outer ply separation from the inner ply in a first axial position along the central axis, the end segments of the inner ply separation from the inner tubular structure in a second axial position, axially offset from the first axial position.
- the step for placing the second shaping guide is performed after the rearward folding of the end segments of the outer ply around the first shaping guide, and before the rearward folding of the end segments toward the inner ply.
- the second shaping guide is positioned in front of the bend formed by the end segments of the outer ply during its placement.
- the placement of the second shaping guide includes the arrangement, around the inner ply, of a front locking collar of the inner ply, the second shaping guide being placed on the front locking collar.
- it includes, after the folding of the end segments of the outer ply, and before the placement of the second shaping guide, cutting an anti-wear strip positioned between the inner ply and the outer ply.
- it includes, after the folding steps, the following steps:
- inserting a front sealing assembly around the inner tubular structure;
- placing a vault of the end-piece in the end of the inner tubular structure;
- folding the end segments of the inner ply forward to place them around the vault;
- removing the second shaping guide;
- folding the end segments of the outer ply forward to place them outwardly at the end segments of the inner ply;
- removing the first shaping guide; and
- fastening an outer cover of the end-piece on the vault, the vault and the outer cover delimiting a chamber between them for receiving the end segments of the inner ply and the outer ply.
- it includes a first step for removing the front collar, after having removed the second shaping guide and before folding the end segments of the inner ply forward to place them around the vault.
- it includes a second step for removing the rear collar, after having removed the first shaping guide and before folding the end segments of the outer play forward to place them outwardly at the end segments of the inner ply.
- it includes inserting a filler material able to solidify in the receiving chamber.
- the first guide and the second guide each have a convex front surface, with the convex side oriented forward, the respective end segments of the outer ply and the inner ply each bearing on a respective front surface of the first guide and the second guide.

The invention also relates to a pre-assembly of a flexible pipe end-piece, the flexible pipe including an inner tubular structure having a central axis, an inner ply of tensile armors positioned around the inner tubular structure and an outer ply of tensile armors positioned around the inner structure, the pre-assembly including:

- a rear locking collar of the armor plies placed around the outer ply;
- a first shaping guide for the folding of the end segments of the outer ply, the end segments of the outer ply bearing on the first guide while forming a bend in front of the rear locking collar;

characterized in that it includes a second shaping guide for shaping the folding of the end segments of the inner ply, separate from the first shaping guide, the end segments of the inner ply bearing on the second guide while forming a bend in front of the rear locking collar.

The pre-assembly according to the invention may include one or more of the following features, considered alone or according to any technically possible combination(s):

- the end segments of the outer ply separate from the inner ply in a first axial position along the central axis, the end segments of the inner ply separation from the inner tubular structure in a second axial position axially offset from the first axial position.
- it includes a front locking collar of the inner ply, the second shaping guide being placed on the front locking collar.
- it includes an anti-wear strip positioned between the inner ply and the outer ply, the anti-wear strip having a front edge situated between the first guide and the second guide.
- the first guide and the second guide each have a convex front surface, with the convex side oriented forward, the respective end segments of the outer ply and the inner ply each bearing on a respective front surface of the first guide and the second guide.

BRIEF DESCRIPTION OF THE DRAWINGS

The invention will be better understood upon reading the following description, provided solely as an example and done in reference to the appended drawings, in which.

DESCRIPTION OF PREFERRED EMBODIMENTS

In the rest of this document, the terms "outer" or "outward" and "inner" or "inward" are generally to be understood radially relative to an axis A-A' of the pipe, the term "outer" being understood as being relatively radially further from the axis A-A' and the term "inner" being understood as being relatively radially closer to the axis A-A' of the pipe.

The terms "front" and "rear" are to be understood axially relative to an axis A-A' of the pipe, the term "front" being understood as being relatively further from the middle of the pipe and closer to one of its ends, the term "rear" being understood as being relatively closer to the middle of the pipe and further from one of its ends. The middle of the pipe is the point of the pipe situated at equal distances from the two ends thereof.

Furthermore, the terms "upstream" and "downstream" are to be understood generally relative to the normal flow direction of an oil fluid within the pipe.

Figure 1:
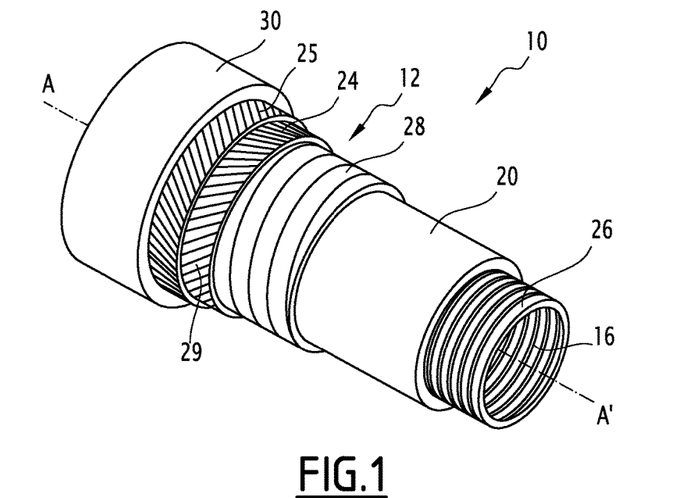
FIG. 1 is a perspective view with partial cutaway of a flexible pipe comprising an end-piece assembled using a method according to the invention.
Figure 2:
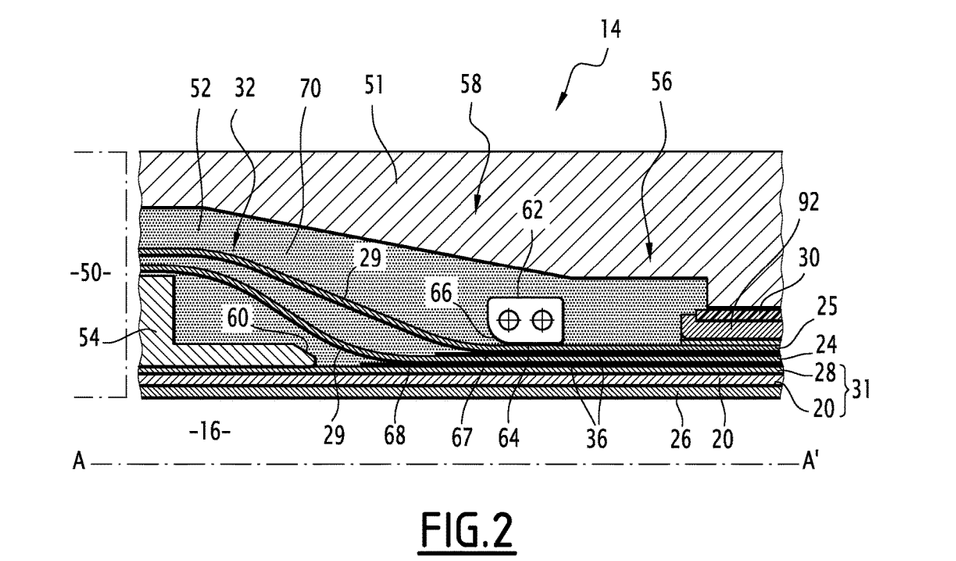
FIG. 2 is a partial diagrammatic view, in cross-section along a median axial plane, of the relevant elements of an end-piece of the pipe of FIG. 1.

A first assembly method according to the invention is implemented during the manufacture of a first flexible pipe 10 according to the invention, partially illustrated by FIG. 1 and FIG. 2.

The flexible pipe 10 includes a central segment 12 illustrated partially in FIG. 1. It includes, at each of the axial ends of the central segment 12, an end end-piece 14 (not shown in FIG. 1), the relevant parts of which are shown in FIG. 2.

The method according to the invention is designed for the assembly of the end-pieces 14 at the ends of the central segment 12.

In reference to FIG. 1, the pipe 10 delimits a central passage 16 for the flow of a fluid, advantageously an oil fluid. The central passage 16 extends along an axis A-A', between the upstream end and the downstream end of the pipe 10. It emerges through the end-pieces 14.

The flexible pipe 10 is designed to be positioned through an expanse of water (not shown) in a fluid exploitation facility, in particular for hydrocarbons.

The expanse of water is for example a sea, lake or ocean. The depth of the expanse of water at the fluid exploitation installation is for example comprised between 500 m and 3000 m.

The fluid exploitation installation includes a surface assembly, in particular floating, and a bottom assembly (not shown), that are generally connected to one another by the flexible pipe 10.

The flexible pipe 10 is preferably an "unbonded" pipe.

At least two adjacent layers of the flexible pipe 10 are free to move longitudinally relative to one another when the pipe bends. Advantageously, all of the layers of the flexible pipe are free to move relative to one another. Such a pipe is for example described in the normative documents published by the American Petroleum Institute (API), API 17J and API RP 17B.

As illustrated by FIG. 1, the pipe 10 delimits a plurality of concentric layers around the axis A-A', which extend continuously along the central segment 12 up to the end-pieces 14 situated at the ends of the pipe.

According to the invention, the pipe 10 includes at least one first sheath 20 with a base of a polymer material advantageously forming a pressure sheath.

The pipe 10 further includes a plurality of tensile armor plies 24, 25 positioned outwardly relative to the first sheath 20.

Advantageously, and depending on the desired use, the pipe 10 further includes an inner carcass 26 positioned inside the pressure sheath 20, a pressure vault 28 inserted between the pressure sheath 20 and the tensile armor plies 24, 25, and an outer sheath 30, designed to protect the pipe 10.

The layers 20, 26, 28 situated inwardly relative to the plies of armors 24, 25 will hereinafter be referred to as "tubular inner structure" 31 of the pipe 10.

In a known manner, the pressure sheath 20 is designed to tightly confine the fluid transported in the passage 16. It is made from a polymer material, for example with a base of a polyolefin such as polyethylene, a base of a polyamide such as PA11 or PA12, or a base of a fluorinated polymer such as polyvinylidene fluoride (PVDF).

The thickness of the pressure sheath 20 is for example comprised between 5 mm and 20 mm.

When the carcass 26 is present, it is formed by a profiled metal sheet, wound in a spiral. The turns of the sheet are advantageously stapled to one another, which makes it possible to react the radial crushing forces.

In this example, the carcass 26 is positioned inside the pressure sheath 20. The pipe is then designated by the term "rough bore" due to the geometry of the carcass 26.

In an alternative that is not shown, the flexible pipe 10 has no inner carcass 26, and is then referred to as "smooth bore".

The helical winding of the profiled metal sheet forming the carcass 26 has a short pitch, i.e., it has a spiral angle with an absolute value close to 90°, typically comprised between 75° and 90°.

In this example, the pressure arch 28 is designed to react the forces related to the pressure prevailing inside the pressure sheath 20. It is for example formed by a metal profiled wire wound in a spiral around the sheath 20. The profiled wire generally has a complex geometry, in particular in the shape of a Z, T, U, K, X or I.

The pressure vault 28 is wound in a spiral with a short pitch around the pressure sheath 20, i.e., with a spiral angle with an absolute value close to 90°, typically comprised between 75° and 90°.

In the example shown in FIG. 1, the flexible pipe 10 includes an inner armor ply 24, pressed on the inner structure 31, and an outer armor ply 25 around which the outer sheath 30 is positioned.

Each armor ply 24, 25 includes longitudinal armor elements 29 wound with a long pitch around the axis A-A' of the pipe.

"Wound with a long pitch" means that the absolute value of the spiral angle is less than 60°, and typically comprised between 25° and 5°.

The armor elements 29 of a first ply 24 are generally wound with an opposite angle relative to the armor elements 29 of a second ply 25. Thus, if the winding angle of the armor elements 29 of the first ply 24 is equal to +α, a being comprised between 25° and 55°, the winding angle of the armor elements 29 of the second ply 25 positioned in contact with the first ply 24 is for example—α, with a comprised between 25° and 55°.

The armor elements 29 are for example formed by metal wires, or by tapes.

As shown in FIG. 2, the armor elements 29 each have an end segment 32 inserted into the end-piece 14. The end segment 32 extends to a free end positioned in the end-piece 14. It advantageously has a spiral or pseudo-spiral trajectory with axis A-A' in the end-piece 14.

In this example, each armor ply of armors 24, 25 rests on at least one anti-wear strip 36. The anti-wear strip 36 is for example made from plastic.

Thus, the anti-wear strip 36 is inserted between the inner pipe 24 and the inner structure 31. Another anti-wear strip 36 is inserted between the inner ply 24 and the outer ply 25.

In the example shown in FIG. 2, the end segment 32 of each armor element 29 is separated to have no anti-wear strip.

The outer sheath 30 is designed to prevent the permeation of fluid from the outside of the flexible pipe toward the inside. It is advantageously made from a polymer material, in particular with a base of a polyolefin, such as polyethylene, a base of a polyamide, such as PA11 or PA12, or a base of a fluorinated polymer such as polyvinylidene fluoride (PVDF).

The thickness of the outer sheath 30 is for example comprised between 5 mm and 15 mm.

As illustrated by FIG. 2, each end-piece 14 includes an end vault 50 and an outer connecting cover 51 protruding axially rearwards from the vault 50. The cover 51 delimits, with the end vault 50, a chamber 52 for receiving the end segments 32 of the armor elements 29.

The end-piece 14 further includes a front sealing assembly 54 around the pressure sheath 20, and a rear sealing assembly 56 around the outer sheath 30.

The end-piece 14 also comprises an assembly 58 for fastening layers of armor 24, 25 in the chamber 52.

In this example, the end vault 50 is designed to connect the pipe 10 to another connecting end-piece 14 or to terminal equipment, advantageously by means of an end flange (not shown).

The cover 51 delimits the chamber 52 radially toward the outside. It covers the outside of the end segments 32 of the armor plies 24, 25 and extends axially to the rear sealing assembly 56.

The front sealing assembly 54 includes at least one crimping ring of the pressure sheath 20. It delimits, toward the rear, an inclined surface 60 for guiding the separation of the end segments 32 of the plies of armor 24, 25.

The fastening assembly 58 includes a rear locking collar 62, pressed on the outer ply 25, and advantageously a solid filler material 70 of the cavity 52, embedding the end segments 32 of the plies 24, 25 and, if one is installed, the collar 62.

The locking collar 62 generally includes a plurality of peripheral segments assembled to one another. Preferably, it assumes the form of a metal collar in several collar parts, for example three parts.

The collar parts advantageously assume the form of peripheral segments with an angular span smaller than 180°, assembled to one another to form the collar 62.

Advantageously, the locking collar 62 remains permanently around the outer ply 25, but it may also be removed before filling the chamber 52 of the end-piece 14.

Preferably, a tape or anti-wear strip (not shown) is inserted between the locking collar 62 and the outer armor ply 25 to prevent any risk of rubbing, and subsequently, wear of the armor elements 29. Typically, the anti-wear strip is made from at least one polymer or a copolymer chosen from among polyamides, polyvinylidenes, etc.

The collar 62 has an inner peripheral surface 64 oriented toward the axis A-A', and pressed on the outer ply 25. It also has a front surface 66 at least partially diverging in the forward direction.

When the end-piece 14 is assembled, and the fastening assembly 58 is in place, each end segment 32 of an armor element 29 radially separate away from the axis A-A', in front of the locking collar 62. Each rear segment of an armor element 29 situated behind the locking collar 62 extends substantially in a cylindrical enclosure with axis A-A'.

In the example shown in FIG. 2, the first axial position 67 for separation of the end segment 32 of the outer ply 25 is situated near the rear collar 62, behind the second axial position 68 for separation of the end segment 32 of the inner ply 24.

The axial separation positions 67, 68 of the respective end segments 32 of the inner ply 24 and the outer ply 25 are therefore spaced axially apart along the axis A-A'. This limits the risk of contact between the respective armor elements 29, and therefore the risk of local weakening of those elements 29.

As will be seen below, the implementation of the assembly method according to the invention comprises forming a pre-assembly 80 of the end-piece 14 shown in FIG. 3.

The pre-assembly 80 includes, aside from the inner structure 31, the armor plies 24, 25, and the rear collar 62, a first shaping guide 82 for shaping the turning over of the outer ply 25 and, according to the invention, a second shaping guide 84 for shaping the turning over of the inner ply 24, axially offset forward relative to the first guide 82 and in contact with the inner face of at least one armor element 29.

Each guide 82, 84 is advantageously made from a material able to preserve the surface of the armor elements 29. For example, each guide 82, 84 is formed from a plastic material, such as a polyamide, in particular nylon.

The guides 82 and 84 include a plurality of peripheral segments assembled to one another or are made in a single part.

The dimensions are variable and depend on the size of the chamber 52 and/or the chosen anchoring configuration of the inner 24 and outer 25 plies.

The first guide 82 is mounted removably on the rear collar 62. In this example, it defines a rear axial housing 86 for insertion of the rear collar 62.

It has a curved and convex front surface 88, with the convex side oriented toward the front. The front surface 88 is preferably circumferential around the axis A-A'.

Advantageously, in section in a median axial plane, the front surface 88 has a curve radius smaller than the minimum curve radius of each armor element 29. This curve radius is for example greater than or equal to 20 mm.

Typically, the first guide 82 is formed by a ring engaged around the outer ply 25.

Figure 3:
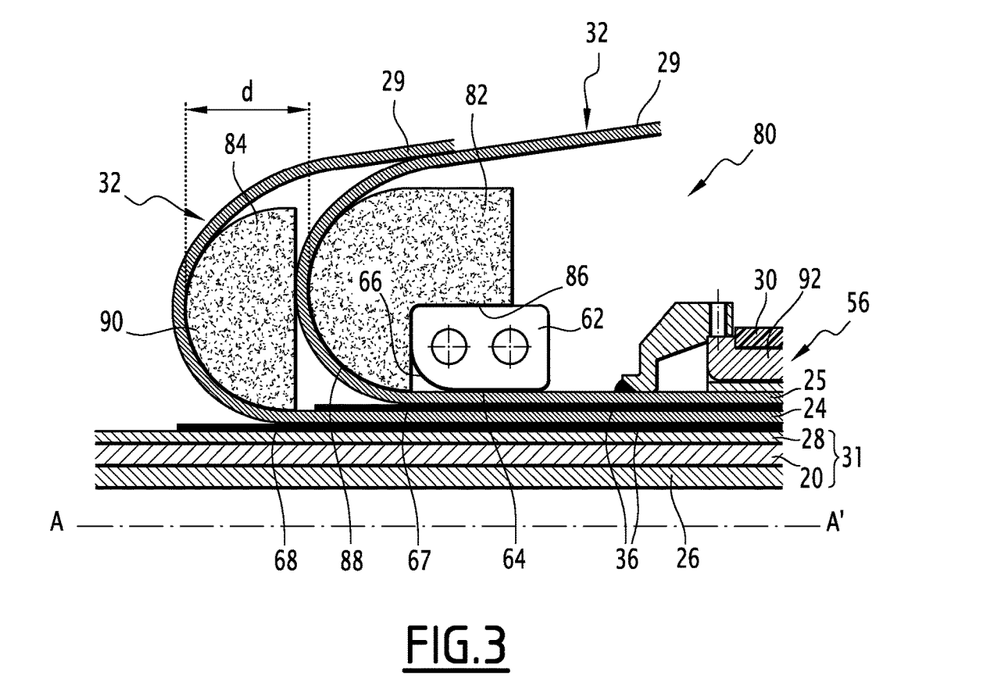
FIG. 3 is a view similar to FIG. 2 of a first pre-assembly according to the invention of the end-piece of FIG. 2, during a step of the assembly method according to the invention, in which the end segments of the armor plies are folded rearwards.

In the example shown in FIG. 3, the second guide 84 is engaged removably around the inner ply 24. It is positioned in front of the first guide 82.

The distance d axially separating the front end of the first guide 82 from the front end of the second guide 84 is greater than or equal to the cumulative length of the curve radius of the front surface 88, the thickness of the outer ply 25 and the total length of the second guide 84.

The second guide 84 has a curved and convex front surface 90, with the convex side oriented forward. The front surface 90 is preferably circumferential around the axis A-A'.

Advantageously, in section in a median axial plane, the front surface 90 has a curve radius smaller than the minimum curve radius of each armor element 29. This curve radius is for example greater than or equal to 20 mm.

Typically, the second guide 84 is formed by a circumferential ring engaged around the inner ply 24.

A method for assembling the end-piece 14 according to the invention will now be described.

Initially, the end of the outer sheath 30 for sealing the central segment 12 of the flexible tubular pipe 10 is cut, to strip the end segments 32 of the armor plies 24, 25.

Then, the rear sealing assembly 56 is placed. To that end, a rear bearing cock 92 is advantageously inserted below the front end of the outer sheath 30.

Next, the rear locking collar 62 of the armor plies 24, 25 is installed around the outer ply 25, in front of the front end of the outer sheath 30.

The segments of the collar 62 are positioned along a circumference around the axis A-A', and are assembled to one another. The inner surface 64 is then outwardly pressed on the outer ply 25.

Preferably, a tape or anti-wear strip (not shown) is inserted between the locking collar 62 and the outer armor ply 25 to prevent any risk of rubbing, and subsequently, wear of the armor elements 29. Typically, the anti-wear strip is made from at least one polymer or a copolymer chosen from among polyamides, polyvinylidenes, etc.

Once that is done, the first shaping guide 82 is installed on the rear locking collar 62, in front of the latter part. In the example shown in FIG. 3, the rear locking collar 62 is partially inserted into the housing 86, such that the first shaping guide 82 is axially wedged on the locking collar 62.

The end segments 32 of the armor elements 29 of the outer ply 25 are then folded rearwards around the front surface 88 of the first guide 82, then radially to the outside of the first guide 82, and the rear locking collar 62.

They press on the front surface 88 of the first guide 82 while forming a bend in front of the rear locking collar 62.

Owing to the relatively large curve radius of the front surface 88, the end segments 32 adopt a relatively small curvature, which limits the risk of damage or mechanical deterioration.

The front end of the anti-wear strip 36 situated between the outer ply 25 and the inner ply 24 is then accessible.

A cut in the front region of the anti-wear strip 36 is then made so that the front edge of that strip 36 extends substantially across from the front end of the first guide 82.

The accessible length of strip 36 is relatively large, which makes it possible to cut it more easily.

Next, the second shaping guide 84 is inserted around the inner ply 24, in front of the first guide 82.

The end segments 32 of the armor elements 29 of the inner ply 24 are then folded rearwards around the front surface 90 of the second guide 84.

They press on the front surface 90 of the second guide 84, forming a bend in front of the second guide 84.

As before, owing to the relatively large curve radius of the front surface 90, the end segments 32 adopt a relatively small curvature, which limits the risk of damage or mechanical deterioration.

Then, the anti-wear strip 36 situated between the inner ply 24 and the inner structure 31 is cut. The front edge of that strip 36 is then placed substantially across from the front end of the second guide 90, axially separated from the front edge of the strip 36 situated between the plies 24, 25.

The front sealing assembly 54 is then placed, in front of the first guide 84, with the engagement of the crimping ring around the inner structure 31.

The end of the vault 28 is thus inwardly inserted in the crimping ring.

The pressure sheath 20 is next crimped by the crimping ring, as well as the pressure vault 28, when it is present.

Figure 4:
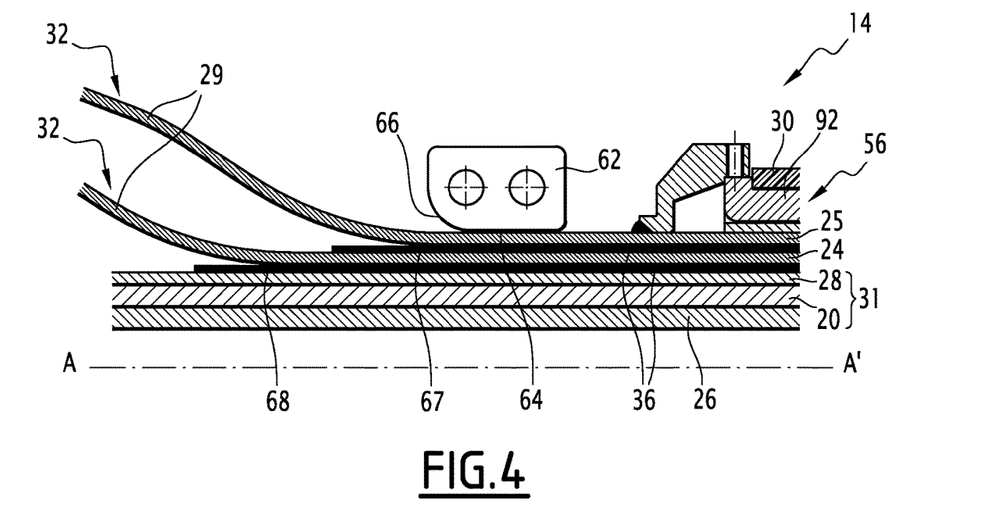
FIG. 4 is a view similar to FIG. 3, after unfolding the end segments of the armor plies forward.

Once that is done, the end segments 32 of the armor elements 29 of the inner ply 24 are folded forward to rest at the vault 28 and the second guide 84 is next removed.

Likewise, and separately, the end segments 32 of the armor elements 29 of the outer ply 25 are folded forward to rest at the inner armor ply 24 and the first guide 82 is next removed.

The axial separation positions 67, 68 of the respective end segments 32 of the inner ply 24 and the outer ply 25 being offset along the axis A-A', the end segments 32 of the armor elements 29 do not come into contact with one another when they are folded forward.

Thus, the risk of rubbing and deterioration between the armor elements 29 of the two plies 24, 25 is reduced. The fatigue behavior of the armor plies 24, 25 is then considerably improved, which increases the integrity of the flexible pipe 10 over time.

Then, the cover 51 is placed around the end segments 32 and is fixed above the vault 50. A fluid material capable of solidifying is advantageously introduced into the chamber 52 to embed the end segments 32 and the rear collar 62.

Figure 5:
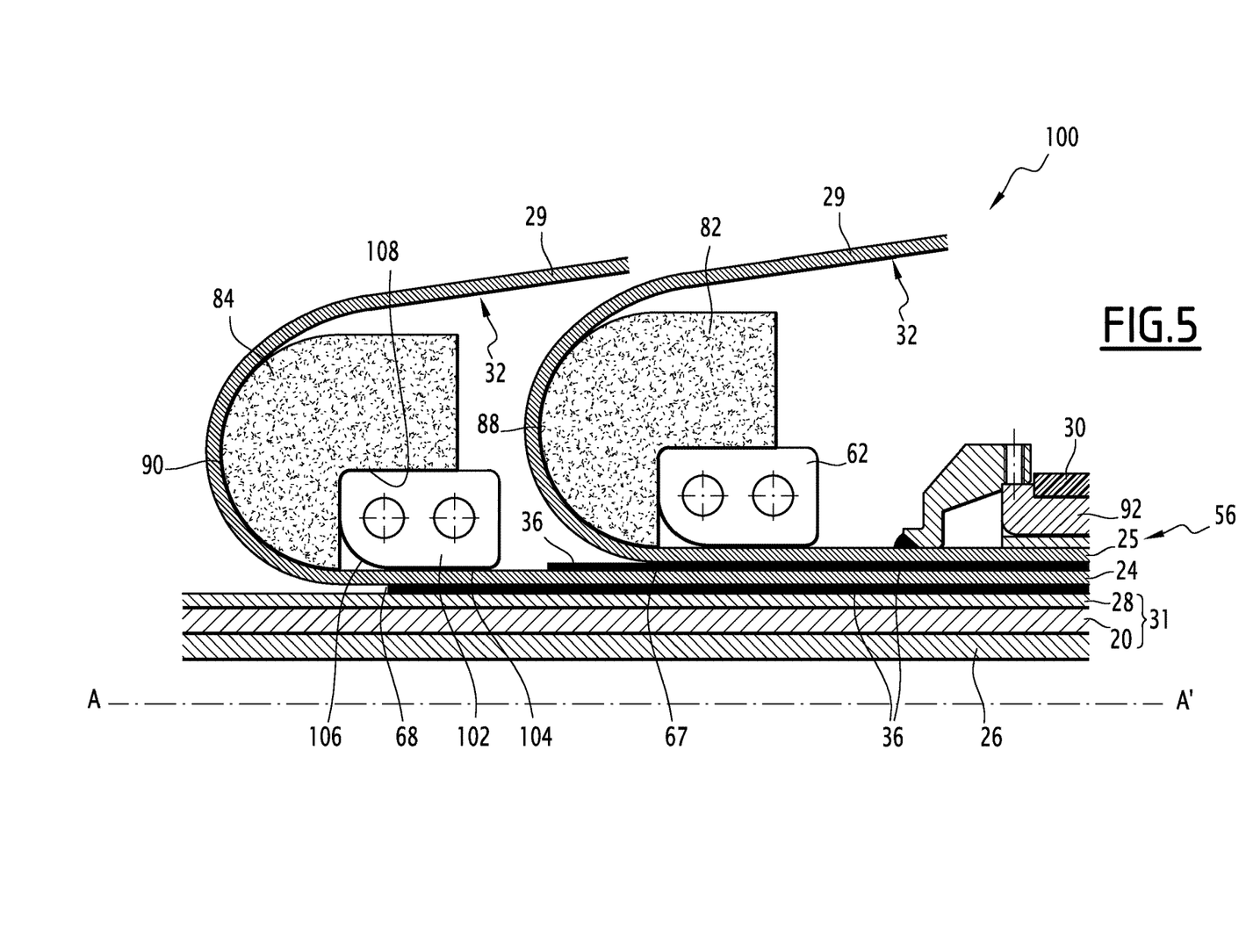
FIG. 5 is a view similar to FIG. 3 of a second pre-assembly according to the invention.

A second pre-assembly 100 according to the invention is illustrated by FIG. 5. Such a pre-assembly 100 is implemented in a second assembly method according to the invention.

Unlike the first pre-assembly 80, the second pre-assembly 100 includes a front locking collar 102. That collar 102 is preferably made from metal.

The front locking collar 102 is assembled around the inner ply 24, inwardly relative to the outer ply 25, in front of the first guide 82.

The front collar 102 advantageously includes a plurality of peripheral segments assembled to one another. Like the rear collar 62, it may remain permanently around the inner ply 24, but it may also be removed before filling the chamber 52 of the end-piece 14.

It has an inner peripheral surface 104 oriented toward the axis A-A', and pressed on the outer ply 25.

As described above relative to the rear collar 62, a tape or an anti-wear strip (not shown) is inserted between the locking collar 102 and the inner armor ply 24 to avoid any risk of rubbing, and subsequently, of wear of the armor elements 29.

It further has a front surface 106 at least partially diverging in the forward direction to limit the separation of the end segments 32 from the inner armor ply 24.

The second guide 84 is mounted removably on the front collar 102. In this example, it defines a rear axial housing 108 for insertion of the front collar 102.

The second assembly method according to the invention differs from the first assembly method in that after the folding of the end segments 32 of the armor elements 29 of the outer ply 25, and after cutting the anti-wear strip 36 situated between the inner ply 24 and the outer ply 25, the front collar 102 is inserted around the inner ply 24 in front of the first guide 82 and advantageously in front of the front edge of the strip 36 situated between the plies 24, 25.

The second guide 84 is then assembled on the front collar 102. The end segments 32 of the armor elements 29 of the inner ply 24 are next folded around the front surface 90 of the second guide 84, then radially outside the second guide 84, and the front collar 102.

The second assembly method is furthermore similar to the first assembly method.

What is claimed is:

1. A method for assembling an end-piece of a flexible pipe, the flexible pipe including an inner tubular structure having a central axis, an inner ply of tensile armors positioned around the inner tubular structure and an outer ply of tensile armors positioned around the inner ply, the method comprising the following steps:

placing a rear locking collar of the armor plies around the outer ply;

placing a first shaping guide for shaping the folding of the end segments of the outer ply;

folding the end segments of the outer ply rearwards while forming a bend in front of the locking collar, the end segments of the outer ply pressing on the first guide;

folding the end segments of the inner ply rearwards;

the method including, before the step for folding the end segments of the inner ply rearwards, placing a second shaping guide for shaping the folding of the end segments of the inner ply, wherein the placing of the second shaping guide is carried out after the rearward folding of the end segments of the outer ply around the first shaping guide and before the rearward folding of the end segments toward the inner ply, the second shaping guide being separate from the first shaping guide, the end segments of the inner ply bearing on the second shaping guide after the folding step, wherein the placing of the second shaping guide includes arranging, around the inner ply, of a front locking collar of the inner ply, the second shaping guide being placed on the front locking collar the method including, after the folding steps, the following steps:
inserting a front sealing assembly around the inner tubular structure;
placing a vault of the end-piece in the end of the inner tubular structure;
folding the end segments of the inner ply forward to place them around the vault;
removing the second shaping guide;
folding the end segments of the outer ply forward to place them outwardly at the end segments of the inner ply;
removing the first shaping guide; and
fastening an outer cover of the end-piece on the vault, the vault and the outer cover delimiting a chamber between them for receiving the end segments of the inner ply and the outer ply.

2. The method according to claim 1, wherein after the folding steps, the end segments of the outer ply separate from the inner ply in a first axial position along the central axis, the end segments of the inner ply separating from the inner tubular structure in a second axial position, axially offset from the first axial position.

3. The method according to claim 1, wherein the second shaping guide is positioned in front of the bend formed by the end segments of the outer ply during its placement.

4. The method according to claim 1, including, after the folding of the end segments of the outer ply, and before the placement of the second shaping guide, cutting an anti-wear strip positioned between the inner ply and the outer ply.

5. The method according to claim 1, including a step for removing the front collar, after having removed the second shaping guide and before folding the end segments of the inner ply forward to place them around the vault.

6. The method according to claim 1, including a second step for removing the rear collar, after having removed the first shaping guide and before folding the end segments of the inner ply forward to place them outside the end segments of the inner ply.

7. The method according to claim 1, including inserting a filler material able to solidify in the receiving chamber.

8. The method according to claim 1, wherein the first guide and the second guide each have a convex front surface, with the convex side oriented forward, the respective end segments of the outer ply and the inner ply each bearing on a respective front surface of the first guide and the second guide.

* * * * *